Figure 1:
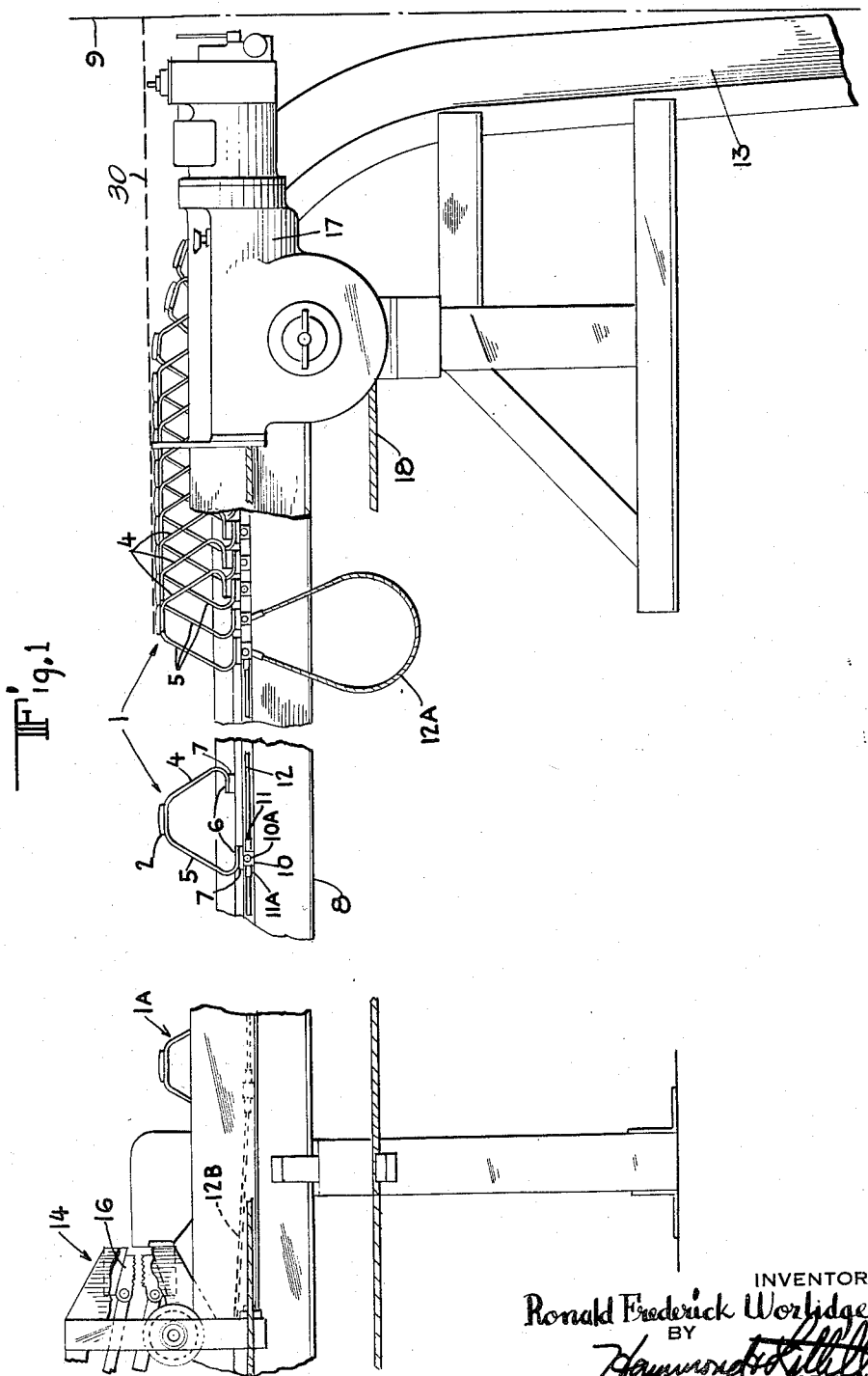

Feb. 23, 1960  R. F. WORLIDGE  2,925,909
EXTRUSION HANDLING EQUIPMENT
Filed Jan. 28, 1958  2 Sheets-Sheet 1

INVENTOR
Ronald Frederick Worlidge
BY
Hammond
ATTORNEYS

Feb. 23, 1960 R. F. WORLIDGE 2,925,909
EXTRUSION HANDLING EQUIPMENT
Filed Jan. 28, 1958 2 Sheets-Sheet 2

INVENTOR
Ronald Fredederick Worlidge
BY
Hammond Littell
ATTORNEYS

United States Patent Office 2,925,909
Patented Feb. 23, 1960

2,925,909

EXTRUSION HANDLING EQUIPMENT

Ronald Frederick Worlidge, Lower Parkstone, England, assignor to The Loewy Engineering Company Limited, Bournemouth, England, a corporation of Great Britain Application January 28, 1958, Serial No. 711,679

Claims priority, application Great Britain February 7, 1957

7 Claims. (Cl. 207—1)

Metal extrusion presses, in which the articles produced are discharged in a straight-line condition, have to be equipped with supporting means of some kind at their outlet end, for the purpose of guiding and receiving these articles as they emerge from the press. These means take generally the form of tables having flat supporting surfaces on which the extruded articles slide during their discharge from the press. This sliding movement may cause the articles to become scratched, or otherwise damaged, especially as the articles, on leaving the press, are still in a fairly hot condition, and, therefore, sensitive to deformation. Scratches and other surface blemishes on the extruded articles are not compatible with the exacting demands which are nowadays made in respect of the quality of the surface finish of these articles.

It is an object of the invention to provide means for supporting extruded material during its discharge from an extrusion press, which means afford an effective support for said material, without subjecting it to the risk of being scratched or undergoing any other superficial damage.

The means for supporting extruded material according to the invention are of the kind in which a supporting surface moves along together with the extruded material, so that the supporting surface remains stationary relative to the material. In this way, the risk of the material being scratched during its contact with the supporting surface is avoided.

It is a well-known fact that the speed at which extruded material emerges from a press is not constant throughout an extrusion operation. It is therefore desirable that the speed at which the material-supporting means move while they are in contact with the extruded material, is synchronized with the speed of the material as closely as possible, and that the supporting means can follow any fluctuations in the speed of discharge of the extruded material without delay.

It is therefore a further object of the invention to provide means for supporting extruded material from a press, comprising a supporting surface travelling along with the extruded material, and in which the mass of the moving parts of the supporting means is relatively small, so that these means can be accelerated or decelerated at the same rate as the change of speed of the extruded material.

According to the present invention, means for supporting extruded material, during its discharge from an extrusion press, comprise a set of separate and inter-connected lightweight supporting elements, the inter-connections between two successive elements being such as to permit the elements to be moved closely together for parking purposes, or to be moved away from each other, for forming a number of spaced-apart supports for the extruded material. The supporting elements are adapted to be moved along the path of discharge of the extruded material, and, for this purpose, the leading element is connected to a pulling mechanism which draws the supporting elements one after another away from their parked positions along the path of discharge of the extruded material. The speed at which the supporting elements travel along the path of discharge is so controlled that it is the same, or substantially the same, as that of the extruded material, so that there is no relative movement between the extruded material and the supporting elements. The supporting element at the trailing end may be connected to a part of the press.

The supporting elements are so arranged that the elements at or near the leading end of the set are, when parked at the outlet end of the press, in readiness to receive the extruded material upon its emergence from the press. At the beginning of an extrusion operation, the leading element moves first, with successive elements following one after another, as they are drawn away from their parked positions. The number of elements which are travelling along the path of discharge and act as supports for the extruded material increases gradually therefore as the extrusion progresses.

The pulling mechanism for withdrawing the supporting elements from their parked positions, and along the path of discharge of the extruded material, may be formed by a device provided for pulling the extruded material away from the press. Such devices are known in themselves, and comprise usually a carriage which can travel along the path of discharge of the extruded material, and on which are mounted sets of clamping jaws which engage the leading ends of the extruded material upon its emergence from the press.

Figure 2:
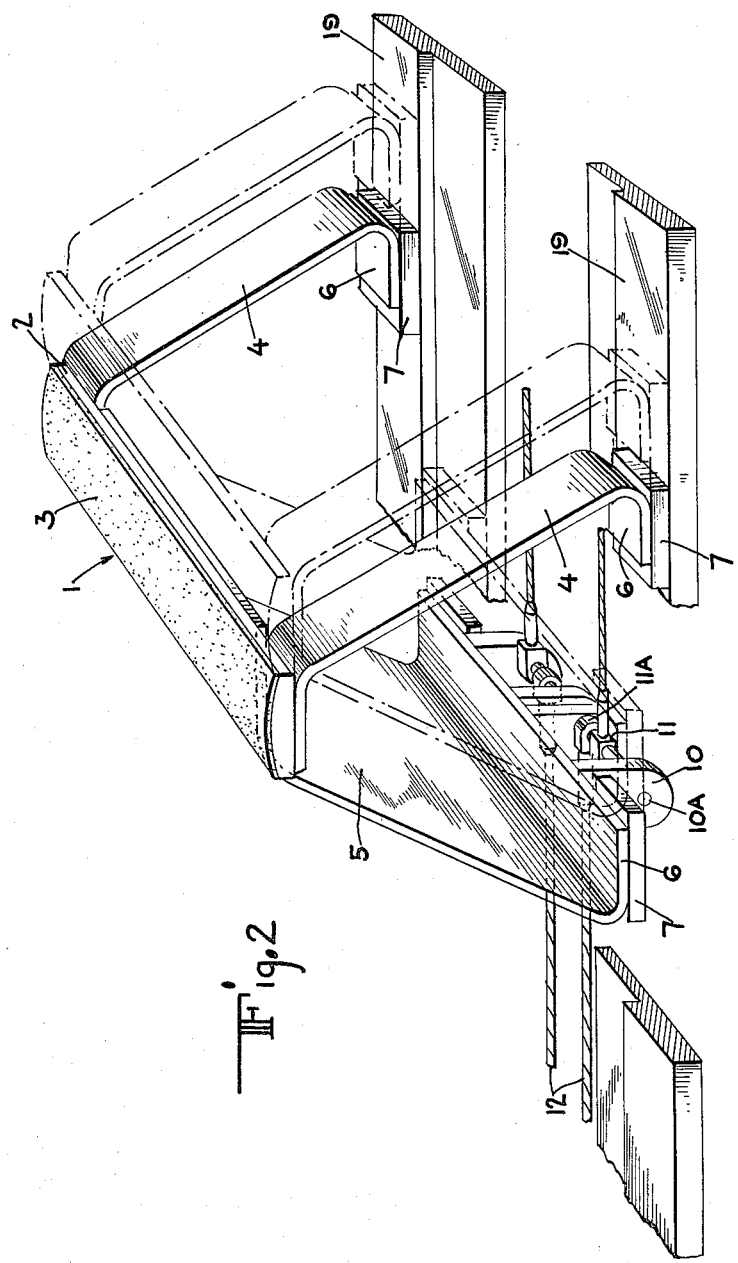

For a better understanding of the invention and to show how it may be carried into effect the same will now be described with reference to the accompanying drawings, wherein:

Figure 1 is a side elevation partly in cross-section of means for supporting extruded material during its discharge from an extrusion press, in accordance with the present invention, and Figure 2 is a perspective view of a supporting element.

As shown, there is provided a plurality of lightweight supporting elements 1 arranged one behind the other. Each element comprises a metal slat 2 which in its operative position extends transversely across the path of the extruded material and is covered with a pad of heat-resistant material 3 of substantial hardness, which will not cause marking of the extruded material. Materials suitable for this purpose may have an asbestos base, and may be of the type commonly used for brake linings such as the material known under the trade name "Mintex." The slat 2 is provided at each end thereof with a laterally depending outer runner 4, while a somewhat longer and larger central runner 5 depends from the opposite side thereof in staggered relationship thereto, the arrangement being such that the central runner 5 of one element may be caused to enter the space between the outer runners 4 of the next element, as shown in chain lines in Figure 2. This enables a succession of supporting elements to be stacked inside each other, or nested so that they, when parked, occupy a minimum of space.

As shown, the lower portions of each runner are turned inwardly to form feet 6 upon which are fitted sliding pads 7. These sliding pads are adapted to engage corresponding guideways provided in a raised and elongated structure 8 extending from a point adjacent the discharge end of the extrusion press which is indicated by the dot dash line 9 in Fig. 1 and in the direction of discharge of the extruded material. The elements which are of simple and compact design are also formed of a low weight metal such as aluminum to maintain the overall weight thereof at a minimum.

The elements 1 are inter-connected one to the other by flexible couplings and to this end the foot 6 of each central runner 5 is provided with two pairs of depending lugs 10. Between each of these pairs of lugs extends a horizontal swivel pin 10A about which is fitted a pair of juxtaposed cable shackles 11, 11A. Pairs of cables 12 inter-connect adjacent elements, the arrangement being such that cable shackles 11, 11A form connecting points for cables extending forward from the element at the rear, or backward from the element in front. Each pair of cables extending between adjacent shackles is staggered to the next so that when the elements are stacked one against the other in their parked positions the cables will hang down in loops 12A without fouling one against the other.

The supporting elements 1, when parked, occupy a comparatively small space due to their stacked disposition. It is preferred to park only a small number of the elements in the path of discharge of the extruded material, and to park the remainder in a space below the plane of discharge 30. This space may be, for instance, in the form of a pit extending below floor level and at right angles to the plane of discharge. Alternatively, the remainder of the supporting elements may be arranged in a plane parallel, but below the surface of the plane of discharge. In both cases, the guideways for the runners of the supporting elements are extended downwardly into the parking space of the supporting elements as shown at 13 (Figure 1).

In order to effect movement of the supporting elements, the leading element 1A is connected to a pulling mechanism 14 through the intermediary of its forwardly extending pair of cables 12B. This pulling mechanism is also movable along a portion of the structure 8 providing guideways 19 for the supporting elements 1, and when operating draws the latter away from their parked positions along the path of discharge of the extruded material. The speed at which the supporting elements 1 travel along the path of discharge of the extruded material is so controlled by movement of pulling mechanism 14 that it is the same, or substantially the same, as that of the extruded material and there is, therefore, no relative movement between the extruded material and the supporting elements. The supporting element at the trailing end of the set may be connected to part of the press to limit untoward movement thereof.

As previously mentioned, the supporting elements 1 are so arranged that the elements at or near the leading end of the set are, when parked at the outlet end of the press, in readiness to receive the extruded material upon its emergence from the press. At the beginning of an extrusion operation, the leading element moves first, with successive elements following one after another, as they are drawn away from their parked positions by the pulling mechanism 14.

The pulling mechanism 14 for withdrawing the supporting elements from their parked positions is constituted, in this instance, by a device, not forming part of present invention, for pulling the extruded material away from the press. The device is provided with jaws 16 and is driven from a constant tension drive 17 operating through a cable 18 and suitable pulleys (not shown). This device may also be used to push the supporting elements back to their parked positions subsequent to an extrusion operation. A pulling device similar to that described above is referred to in our co-pending British patent applications No. 17,232/57, filed May 30, 1957, and No. 17,705/57, filed June 4, 1957. It may incorporate a constant tension drive such is described in our co-pending British patent application No. 2,278/57 filed January 22, 1957, and United States application Serial No. 708,414, filed January 13, 1958. By using the same device for withdrawing the supporting elements and for pulling the extruded material from the press, it is ensured that the elements move at the same speed as the extruded material.

If desired, the inter-connections between the individual supporting elements and between the pulling mechanism may be formed by collapsible linkage instead of the cable described.

What is claimed is:

1. An extrusion handling apparatus for use with an extrusion press and with an extrusion pulling mechanism positioned to travel along the path of discharge of the extruded material from the extrusion press with a speed substantially the same as the speed of the extruded material, which comprises guideway means, a plurality of substantially identical nesting supporting elements successively slidable on said guideway means along the path of the material extruded from the press, each of said supporting elements having one side thereof facing the extrusion end of the press and provided with a pair of spaced outer runners engaging said guideway means and having the side opposite to said one side provided with a central runner engaging said guideway means, the width of said central runner being at most equal to the distance between said outer runners whereby the central runner of each of said supporting elements is slidable between the outer runners of the immediately adjacent supporting element whereby said supporting elements may be nested for parking in a relatively small space, and flexible coupling members successively connecting said supporting elements in series for successively drawing said supporting elements along said guideway means in the direction of the path of discharge of the extruded material, the leading of said coupling members being secured to said extrusion pulling mechanism so that movement of the latter in the direction of movement of the extruded material successively tensions said coupling members to successively set said supporting elements in sliding motion along said guideway means at a speed substantially equal to the speed of the material extruded.

2. An extrusion handling apparatus constructed according to claim 1, wherein each of said supporting elements is further provided with an upper slat of heat resistant material having its top surface coinciding with the plane of discharge of the extruded material for supporting the extruded material.

3. An extrusion handling apparatus for use with an extrusion press and with an extrusion pulling mechanism positioned to travel along the path of discharge of the extruded material with a speed substantially the same as the speed of the extruded material, which comprises guideway means, a plurality of substantially identical and nesting supporting elements successively slidable on said guideway means along the path of the material extruded from the press, each of said supporting elements having one side thereof provided with a pair of spaced outer runners and having the opposite side thereof provided with a central runner, the width of said central runner being smaller than the distance between said outer runners whereby the central runner of each of said supporting elements is insertable between the outer runners of the immediately adjacent supporting element for parking said supporting elements in a relatively small space, and flexible coupling members successively connecting said supporting elements in series and operatively connected to said pulling mechanism and driven thereby to successively couple said supporting elements in series and successively become tensioned for successively drawing said supporting elements along said guideway means in the direction of movement of the extruded material at a speed equal to the speed of the material extruded from the press.

4. An extrusion handling apparatus constructed in accordance with claim 3, wherein each of said supporting elements is further provided with an upper slat of heat resistant material having its top surface coinciding with the plane of discharge of the extruded material and for supporting the extruded material.

5. An extrusion handling apparatus for use with an extrusion press and with an extrusion pulling mechanism positioned to travel along the path of discharge of the extruded material with a speed substantially the same as the speed of the extruded material, which comprises guideway means, a plurality of substantially identical supporting elements successively slidable on said guideway means along the path of the material extruded in the press, each of said supporting elements having one side thereof provided with a pair of spaced outer runners and having the opposite side thereof provided with a central runner, each of said supporting elements further including a slat between said central runner and said outer runners, and cables successively connecting said supporting elements in series and for successively drawing each of said supporting elements along said guideway means in the direction of motion of the extruded material at a speed substantially equal to the speed of the material extruded by the press, the leading cable attached to the first of said supporting elements being attached to and driven by said extrusion pulling mechanism.

6. An extrusion handling apparatus for use with an extrusion press and with an extrusion pulling mechanism positioned to travel along the path of discharge of the extruded material with a speed substantially the same as the speed of the extruded material, which comprises guideway means, a plurality of substantially identical nesting supporting elements successively slidable on said guideway means for successively engaging and supporting the extruded material at spaced intervals, flexible coupling members successively connecting said supporting elements in series for consecutively drawing each of said supporting elements along said guideway means and in the direction of the path of discharge of the extruded material, the leading of said coupling members being secured to said extrusion pulling mechanism so that movement of the latter in the direction of movement of the extruded material successively tensions said coupling members to successively set said supporting elements in sliding motion along said guideway means at a speed equal to the speed of the extruded material, whereby the contacting surfaces of the supporting elements and of the extruded material remain constant and stationary relative to each other.

7. An extrusion handling apparatus constructed in accordance with claim 6, wherein each of said supporting elements is further provided with an upper slat of heat resistant material having its top surface coinciding with the plane of discharge of the extruded material for abutting the latter and wherein each of said supporting elements is made from a lightweight metal.

References Cited in the file of this patent

UNITED STATES PATENTS

| | | |
|---|---|---|
| 1,531,344 | Nelson | Mar. 31, 1925 |
| 1,951,073 | Wallis | Mar. 13, 1934 |
| 2,379,622 | Butler | July 3, 1945 |
| 2,446,438 | Strock | Aug. 3, 1948 |
| 2,720,310 | Yack et al. | Oct. 11, 1955 |
| 2,803,215 | Edgecombe et al. | Aug. 20, 1957 |

FOREIGN PATENTS

| | | |
|---|---|---|
| 559,450 | Great Britain | Feb. 21, 1944 |
| 628,494 | France | June 28, 1927 |
| 875,036 | Germany | Apr. 30, 1953 |